(12) United States Patent
Caldwell et al.

(10) Patent No.: US 6,687,349 B1
(45) Date of Patent: Feb. 3, 2004

(54) SYSTEM AND METHOD FOR DEFINING A LOCAL COMMUNICATION SPACE

(75) Inventors: Charles David Caldwell, Cliffwood Beach, NJ (US); John Bruce Harlow, Middletown, NJ (US); Robert Sayko, Colts Neck, NJ (US); Norman Shaye, Lakewood, NJ (US)

(73) Assignee: AT&T Corp., New York, NY (US)

( * ) Notice: Subject to any disclaimer, the term of this patent is extended or adjusted under 35 U.S.C. 154(b) by 302 days.

(21) Appl. No.: 09/774,953

(22) Filed: Jan. 31, 2001

(51) Int. Cl.[7] .............................................. H04M 15/00
(52) U.S. Cl. ............... 379/120; 379/114.1; 379/114.02; 379/114.05; 379/114.06
(58) Field of Search ............................. 379/120, 114.1, 379/114.02, 114.05, 114.06, 201.01, 202.01

(56) References Cited

U.S. PATENT DOCUMENTS

| | | | | |
|---|---|---|---|---|
| 5,666,405 A | * | 9/1997 | Weber | 379/127.03 |
| 5,673,310 A | * | 9/1997 | Andruska et al. | 379/230 |
| 5,740,239 A | * | 4/1998 | Bhagat et al. | 379/221.13 |
| 5,905,791 A | | 5/1999 | Goel et al. | 379/220 |
| 5,923,741 A | | 7/1999 | Wright et al. | 379/114 |
| 6,212,506 B1 | * | 4/2001 | Shah et al. | 705/418 |
| 6,252,952 B1 | * | 6/2001 | Kung et al. | 379/114.1 |
| 6,418,206 B1 | * | 7/2002 | Leppanen | 379/114.01 |

* cited by examiner

*Primary Examiner*—Curtis Kuntz
*Assistant Examiner*—Barry W Taylor

(57) ABSTRACT

A local communication space (e.g., a local calling area) is defined based at least on a non-geographic factor, such as subscriber preference, a frequency of communication with a given destination, a destination type, and/or the like. The local communication space may be defined by compiling a list of communication spaces and allowing a subscriber to select one or more of the communication spaces as his or her local communication space, and/or by allowing a subscriber to individually input one or more communication destinations. A limit may be placed on the number of communication spaces that may be selected and/or on the number of individual communications destinations that may be input. Subscribers may be billed according to how many communication spaces and/or how many individual communication destinations they select.

17 Claims, 6 Drawing Sheets

200

ID# 6,687,349 B1

SYSTEM AND METHOD FOR DEFINING A LOCAL COMMUNICATION SPACE

BACKGROUND OF THE INVENTION

1. Field of Invention

This invention relates to a system and method for defining a communication space.

2. Description of Related Art

Conventionally, calling areas within a telephone network have been defined based on geography. For example, all numbers within a specified radius of a specified switch were defined as a local calling area. Furthermore, all numbers in a specified local calling area typically have at least a similar area code (the first three digits of a number, e.g., 703-308-XXXX), and often also have a similar exchange code (the next three digits of the number, e.g., 703-308-XXXX).

Some recent services do not rely on a geographical proximity to give subscribers reduced billing rates on calls placed to certain numbers. In these services, a first subscriber may receive a reduced billing rate on a call placed to the number of a second subscriber by specifying the number of the second subscriber in the first subscriber's phone list. However, such services require that the second subscriber also specifies the number of the first subscriber as part of the second subscriber's phone list in order for the first subscriber to receive the benefit of a lower billing rate. Additionally, these services do not treat a call placed to the number of the second subscriber as a "local" call in that they assess a minute-based charge, albeit a reduced charge.

Accordingly, better methods are needed to improve service to subscribers and to facilitate billing for communication services.

SUMMARY OF THE INVENTION

When telephone services are provided over a network other than a standard telephone network, such as a Public Switched Telephone Network (PSTN), it is difficult to exactly reproduce the "local calling areas" that were previously defined according to traditional telephone network topology. For example, when telephone services are provided over a Hybrid Fiber Cable (HFC) network, the HFC network topology may not necessarily coincide with existing PSTN local calling areas. Accordingly, individual numbers are not necessarily associated with a specific network element, such as a central office, since the routing of calls is accomplished by Internet Protocol (IP) addressing.

Furthermore, with Geographic Local Number Portability (G-LNP), a relatively recent concept that allows a subscriber to move to any geographic location (at least within the United States) and keep the same telephone number, the question of whether a telephone call is a local call or a toll call cannot be answered by looking at the area code and/or exchange code, as has been done conventionally. Therefore, billing for telephone calls requires more processing. Additionally, a customer may not be able to know, based merely on characteristics (e.g., the area code and/or the exchange code) of the number dialed, whether a call will be treated as a local call or a toll call.

This invention provides a system and method for defining a local communication space based at least on a non-geographic factor, such as subscriber preference, a frequency of communication with a given destination, a destination type, and/or the like. The local communication space may be defined by compiling a list of communication spaces and allowing a subscriber to select one or more of the communication spaces as their local communication space, and/or by allowing a subscriber to individually input one or more communication destinations.

The number of communication destinations may be limited to a predetermined number. Furthermore, the subscriber may be billed according to the number of individually input communication destinations, the number of predefined communication spaces that they select, and/or the type of predefined communication spaces that they select. For example, a subscriber that selects five predefined communication spaces and one hundred individually input communication destinations may be billed more than a subscriber who selects only two predefined communication spaces and only fifty individually input communication destinations.

BRIEF DESCRIPTION OF THE DRAWINGS

The invention will be described based on the following drawings, in which like numbers represent like elements, and in which.

DETAILED DESCRIPTION OF PREFERRED EMBODIMENTS

Figure 1:
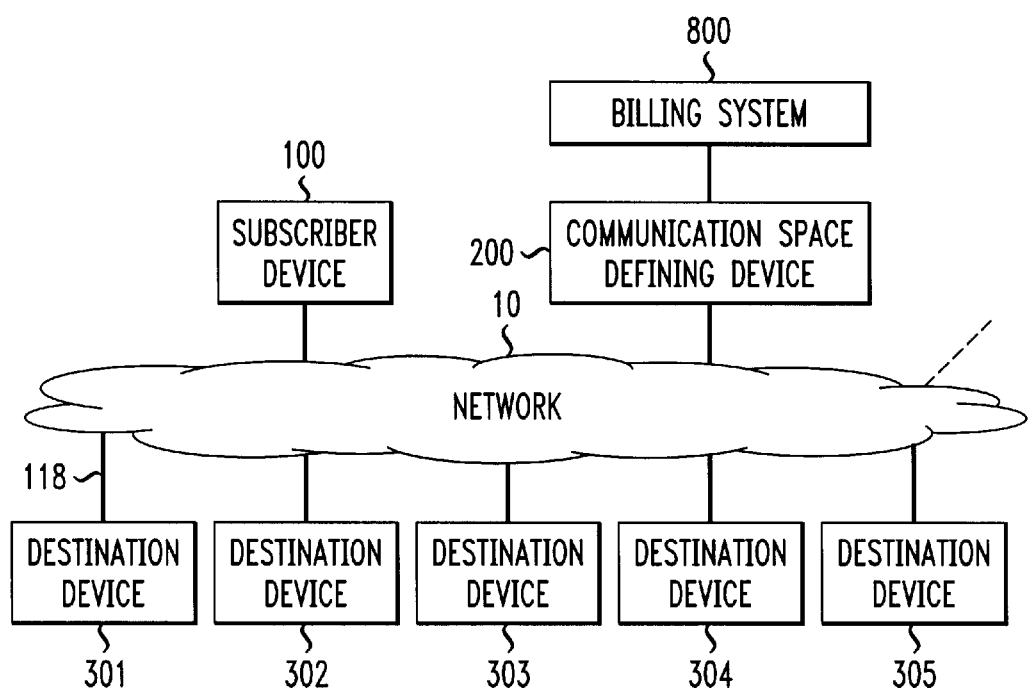
FIG. 1 shows an exemplary block diagram of a communication space defining system in accordance with the present invention.

FIG. 1 shows an exemplary block diagram of a communication space defining system 1. The system 1 typically includes a network 10, a subscriber device 100, a communication space defining device 200, and communication destination devices 301–305. Further, a billing system 800 may be linked to the communication space defining device 200.

A communication space may be, for example, a telephone calling area, such as a local calling area, an intra-LATA (Local Area Toll Access) calling area, or an inter-LATA (e.g., long-distance) calling area, that is accessible using a subscriber device 100. A communication space may also be a selected number of destination devices 301–305 that are grouped together based at least on a non-geographic factor, such as subscriber preference, destination type, frequency of communication or the like. A communication space may even be a single one of destination devices 301–305, corresponding, for example, to a single telephone number.

The subscriber device 100 and the destination devices 301–305 can be devices of any type that allow for the transmission and/or reception of communication signals. For example, subscriber device 100 and destination devices 301–305 can include land-line telephones, cellular telephones, computers, personal digital assistants, video telephones, video conference apparatuses, smart or computer-assisted televisions, WebTV and the like. For the purposes of the following description of the present invention, it will be assumed that subscriber device 100 and destination devices 301–305 are telephones. Furthermore, it will be appreciated that the present invention has a particular advantage when used in an HFC network environment.

The subscriber device 100, the communication space defining device 200, and the destination devices 301–305 are in communication with the network 10, over communication links 118. Additionally, the billing system 800 is in communication with the communication space defining device 200 via a communication link 118. These communication links 118 may be any type of connection, or combination of types of connections, that allows for the transmission of information. Some examples include conventional telephone lines, coaxial cable lines, digital transmission facilities, fiber optic lines, direct serial/parallel connections, cellular telephone connections, satellite communication links, local area networks (LANs), Intranet and the like, or any combination thereof.

The network 10 may be a single network or a plurality of networks of the same or different types. For example, the network 10 may include a local telephone network in connection with a long-distance network (such as an AT&T long-distance network). Furthermore, the network 100 may be a data network or a telecommunications network in connection with the data network. Any combination of telecommunication and data networks may be used without departing from the spirit and scope of the present invention. For the purposes of discussion, it will be assumed that the network 10 is a Hybrid Fiber Cable (HFC) network.

The communication space defining device 200 allows a subscriber to personalize their local communication space. The subscriber may be allowed to personalize the local communication space by designating a "calling group", e.g., by individually designating destination devices 301–305, up to a predetermined number (for example, fifty or one hundred), to be included in the local communication space. Additionally or alternatively, the subscriber may be presented with a list of pre-identified communication spaces, and allowed to select one or more of these pre-identified communication spaces as the local communication space (or as a part of the local communication space).

The billing system 800 bills a subscriber based, for example, on time spent communicating via the subscriber device 100, and/or on whether a communicated-with destination device 301–305 is part of a local communication space defined for the subscriber device. The billing system 800 may also assess one-time charges, such as when a new subscriber account is opened or when a subscriber upgrades their service by subscribing to more services, and/or provider-offered features, and/or periodic charges, such as monthly access charges, equipment rental charges, repair charges, and/or the like.

The communication destination devices 301–305 may be located at diverse geographic locations, such as in different cities or states. Any or all of the communication destination devices 301–305 can also be designated to be part of a subscriber's local communication space, so that whenever communication is performed between the subscriber device 100 and any of the communication destination devices 301–305, the subscriber will be billed by the billing system 800 as if the communication were a local call. Therefore, for example, the subscriber can be charged a monthly access fee, and not be billed for individual communications to any of the communication destination devices 301–305.

When the subscriber that uses the subscriber device 100 is allowed to designate a "calling group", the subscriber individually designates the destination devices, e.g., destination devices 301–305, they desire to include in their local communication space. For example, the subscriber may be allowed to designate up to a specified number, such as one hundred, of destination devices in the "calling group".

In addition to communicating with friends and family, many subscribers often call service establishments, such as restaurants, plumbing repair services, libraries, schools, local government services, movie theaters, the like. It may be troublesome or inconvenient for subscribers to anticipate and input every such service establishment into the "calling group", and the subscriber may only communicate with such establishments on an infrequent basis. However, when the subscriber contacts a pizza establishment to order a pizza, the subscriber may not wish to be billed for the call, since subscribers have come to expect that such calls are "free".

Therefore, the communication space defining device 200 may identify one or more communication spaces that are likely to be desired by a subscriber as the subscriber's local communication space, or as a part of the subscriber's local communication space. For example, if the communication service provider determines or believes that a high percentage of subscribers enjoy pizza, the communication service provider may program the communication space defining device 200 to identify communication devices of several pizza establishments as a communication space. If the communication service provider determines or believes that a high percentage of subscribers enjoy bowling, the communication service provider may also program the communication space defining device 200 to identify communication devices of several bowling establishments as a communication space. The communication service provider may also program the communication space defining device 200 to identify standard communication space "packages" to offer subscribers. For example, a standard communication space "package" may include several pizza establishments, several movie theaters, several Mexican restaurants, several plumbers, several heating/cooling system service establishments, several libraries, schools, community government numbers, and the like.

Although the communication spaces are identified based at least on one or more non-geographic factors, such as communication destination type (e.g., pizza establishments, plumbers or the like), it should be appreciated that geographic factors may also be included. For example, a subscriber who lives in New York City will not likely find it useful to have communication devices of bowling establishments in Houston as part of his or her local communication space. Therefore, a bowling-related part of the New York City subscriber's local communication space might only include communication devices of bowling establishments in New York City.

Thus identifying communication spaces can provide communication services providers with an additional source of revenue because, for example, if only a limited number of service establishments are included in a pre-identified communication space "package" that is presented to subscribers, the service establishments may competitively bid to be included in the pre-identified communication space "package".

Communication service providers may offer different standard communication space packages that may appeal to different subscribers. For example, subscribers who are homeowners will likely need to call plumbers, heating/cooling system service companies, remodelers, yard services and the like. On the other hand, subscribers who are renters will likely not need to call such services. Therefore, by offering a variety of different standard communication space packages, communication services providers can allow different types of subscribers to personalize their local communication spaces.

The communication space defining device 200 may allow a specified number, such as fifty or one hundred, of communication destination devices 301–305 to be included in the local communication space. These may be manually input by the subscriber. Alternatively, the communication space defining device 200 may automatically include communication destination devices 301–305, up to the specified number, as they are called. The communication service provider may also program the communication space defining device 200 to automatically track the subscriber's communication patterns and automatically include frequently-accessed communication destination devices in the subscriber's local communication space, and/or to delete less-frequently accessed communication destination devices from the subscriber's local communication space. For example, the communication space defining device 200 may "age" the list of communication destination devices in the local communication space by deleting devices that are only called once or a relatively few number of times within a given time period (e.g., a week or a month). Thus, the communication space defining device 200 may maintain an up-to-date list of devices that are appropriate to be included in a subscriber's local communication space by (1) identifying and including frequently accessed communication destination devices and (2) "weeding out" less-frequently accessed communication destination devices, or communication destination devices that were frequently accessed at one time, but are no longer frequently accessed (e.g., communication devices of now-out-of-business pizza establishments, ex-girlfriends, and the like).

A communication service provider may program the billing system 800 to bill subscribers at different access charges. For example, subscriber A selects communication space package A, which includes communication devices of homeowner-oriented services (plumbers, yard services, etc.), communication space package B, which includes a variety of restaurants, and communication space package C, which includes a variety of entertainment establishments (movie theaters, video rental stores, etc.), and also selects an option allowing him or her to input one hundred additional communication destination devices (belonging to acquaintances, family, work, etc.). In contrast, subscriber B only selects communication space packages B and C, and selects an option allowing him or her to input fifty additional communication destination devices. In this case, the billing system 800 may bill subscriber A a higher monthly access charge, and/or one-time access charge, than subscriber B.

While the communication space defining device 200 is shown as an independent unit coupled to the network 10, it can also be incorporated into the subscriber device 100, and/or may be distributed throughout the network 10. For example, the communication space defining device 200 may be made part of the various central offices or servers (not shown) employed by the network 10 which are distributed throughout the network 10. Any configuration that permits the monitoring and control of the network 10 can be used without departing from the spirit and scope of the present invention.

Similarly, while the billing system 800 is shown as a single, separate unit, it may also be a distributed system, and/or may be part of the communication space defining device 200. Additionally, while the billing system 800 is shown directly linked to the communication space defining device 200, it may alternatively be linked to the communication space defining device 200 via the network 10.

Figure 2:
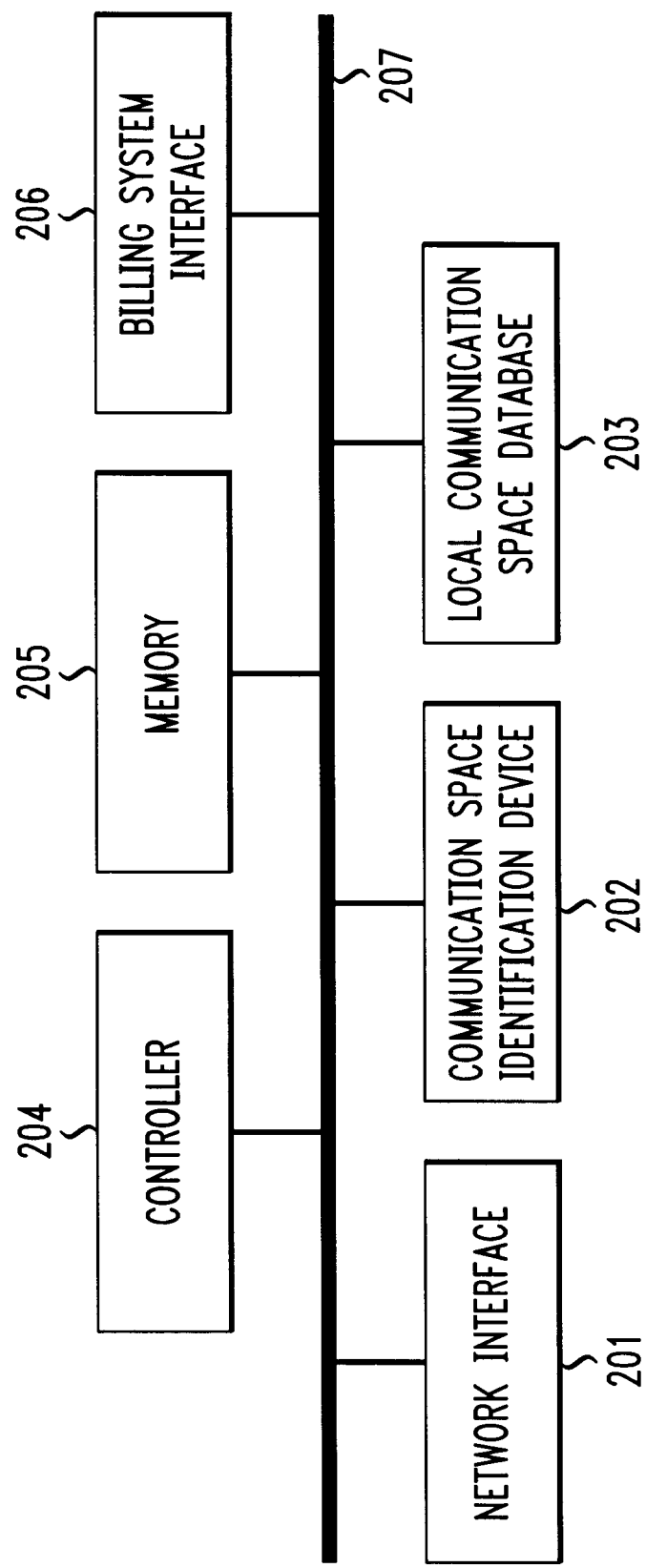
FIG. 2 shows an exemplary functional block diagram of the communication space defining device of FIG. 1.

FIG. 2 shows a functional block diagram of the communication space defining device 200. The communication space defining device 200 includes a network interface 201, a communication space identification device 202, a local communication space database 203, a controller 204, a memory 205 and a billing system interface 206, all of which can be interconnected by a signal bus 207.

The communication space defining device 200 presents selection options or opportunities to a subscriber, receives the subscriber's response, and/or monitors the subscriber's communication patterns via the network interface 201.

The communication space identification device 202 identifies communication spaces. This identification may be performed in a variety of ways. As one example, the communication space identification device 202 may include or have access to a database of pre-stored communication space standard packages, which may have been manually input by a human operator.

As another example, the communication space identification device 202 may include or have access to one or more databases (not shown) of various service establishments, their communication numbers (e.g., their telephone numbers), and possibly their geographic locations (e.g., the cities in which they are located, or their street addresses). Using this information, and, optionally, personal information supplied by a subscriber (e.g., age, residence ownership status (buying or renting), food preferences, residence address, etc.), the communication space identification device 202 may automatically generate one or more proposed communication spaces.

As yet another example, the communication space identification device 202 may identify communication spaces based directly on subscriber input. For example, the subscriber may directly designate one or more individual communication destination devices to be included in a local communication space.

As still another example, the communication space identification device 202 may track the subscriber's communication patterns over time and automatically include frequently-communicated-with communication devices in a subscriber's local communication space.

After a subscriber selects one or more communication spaces provided by the communication space identification device, and/or designates one or more individual communication destination devices, the selected items are defined as the subscriber's local communication space and stored in the local communication space database 203. Over time, the communication space identification device 202 may monitor the subscriber's communication patterns and automatically update the subscriber's local communication space in the local communication space database 203, if necessary.

The controller 204 exerts control as needed for the other elements within the communication space defining device 200 to perform their functions. The memory 205 stores any necessary programs executed by the controller 204 and/or the communication space identification device 202, and may also, if desired or necessary, serve as a buffer to temporarily store information sent to or from other elements within the communication space defining device 200.

The communication space defining device 200 is connected to the billing system 800 via a billing system interface 206. When a communication is performed from the subscriber device 100 to one of the destination devices 301–305, the billing system 800 accesses the local communication space database 203 and determines whether the destination device communicated with from the subscriber device 100 is part of the local communication space defined for the subscriber device 100, and then bills (or doesn't bill) the subscriber as appropriate. For example, the billing system 800 doesn't bill for the communication when the communicated-with destination device 301–305 is listed in the local communication space database 203, and does bill for the communication when the communicated-with destination device 301–305 is not listed in the local communication space database 203.

It should be appreciated that, rather than making a simple bill/don't bill determination, the billing system 800 may, if a charge is to be assessed, calculate a charge based on time of day, geographical distance, and/or the like.

Figure 3:
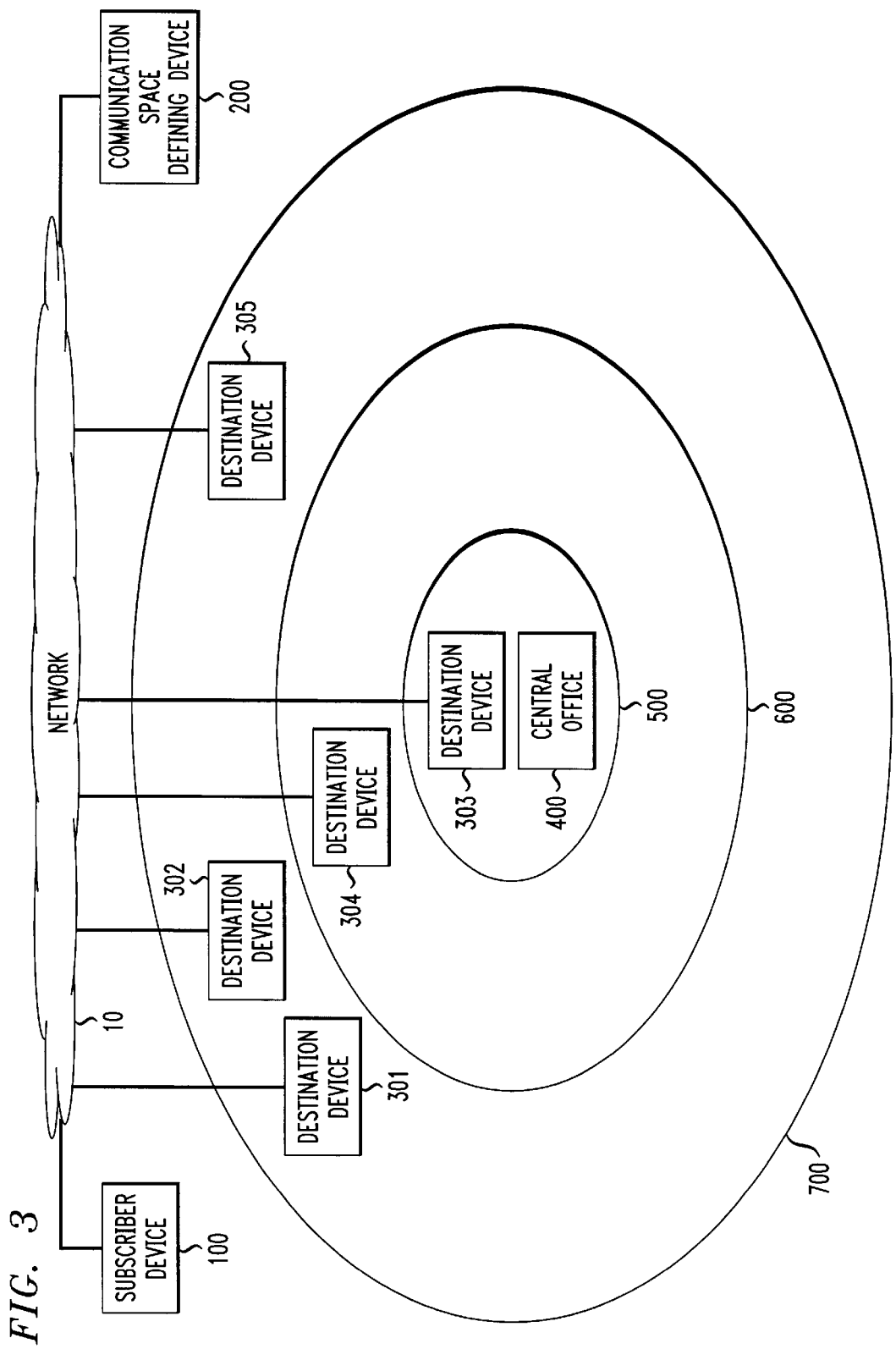
FIG. 3 shows the network of FIG. 1 overlaid on a traditional telephone network topology.

FIG. 3 is a logical depiction of the communication space defining system 1 of FIG. 1 overlaid on a traditional telephone network topology. As described above, all of destination devices 301–305 are part of the local calling area defined for the subscriber device 100. For example, destination devices 301, 302 and 305 belong to relatives of the subscriber who live in different states, destination device 303 belongs to a pizza restaurant near the subscriber, and destination device 304 belongs to the subscriber's work associate who lives in a neighboring town.

With traditional telephone network topology, the subscriber would be served by a central office 400, with a local calling area 500 defined within a certain geographic area around the central office, an intra-LATA calling area 600 defined around the local calling area 500, and an inter-LATA calling area 700 defined around the intra-LATA calling area. Destination devices 301, 302 and 305 would be located within the inter-LATA calling area 700, destination device 303 would be located within the local calling area 500, and destination device 304 would be located within the intra-LATA calling area 600. However, since each of the destination devices 301–305 are designated as part of the subscriber's local communication space, communications to any of the destination devices 301–305 are treated as local communications.

Figure 4:
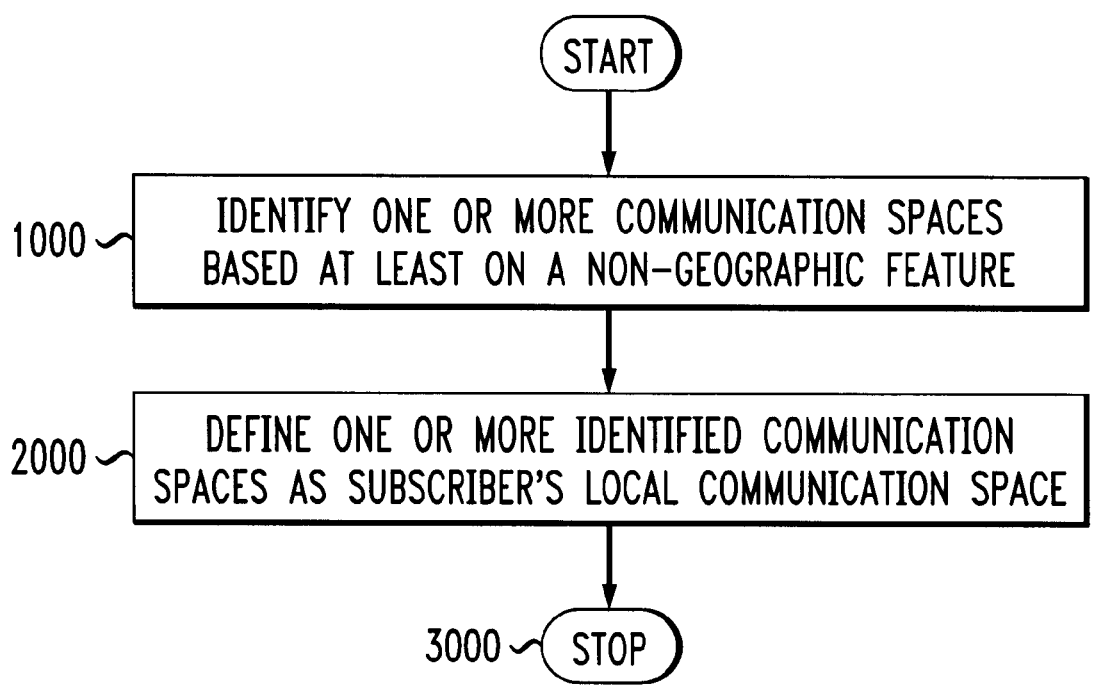
FIG. 4 is a flowchart outlining one exemplary method for identifying and defining a local communication space.

FIG. 4 is a flowchart outlining one exemplary method for identifying and defining a local communication space. In step 1000, the process identifies one or more communication spaces based at least on non-geographic information. The non-geographic information may, for example, be communication destination type, a frequency of communication, a subscriber preference, or the like.

After the one or more communication spaces are identified, the process goes to step 2000. In step 2000, one or more of the identified communication spaces are defined as a subscriber's local communication space. The process then goes to step 3000, where the process ends.

It should be appreciated that there should be subscriber input in at least one of steps 1000 and 2000. For example, if one or more communication spaces are automatically identified in step 1000, then the subscriber should be allowed to select from among the identified communication spaces in step 2000. However, if the subscriber designates desired communication destinations as part of step 1000, then the defining step 2000 may be performed automatically. Of course, there may be subscriber input in both steps 1000 and 2000. Furthermore, in step 1000, the subscriber input may be indirect. For example, the subscriber's communication patterns may be monitored to identify frequently-communicated-with communication devices, and this monitoring can constitute the subscriber input.

Figure 5:
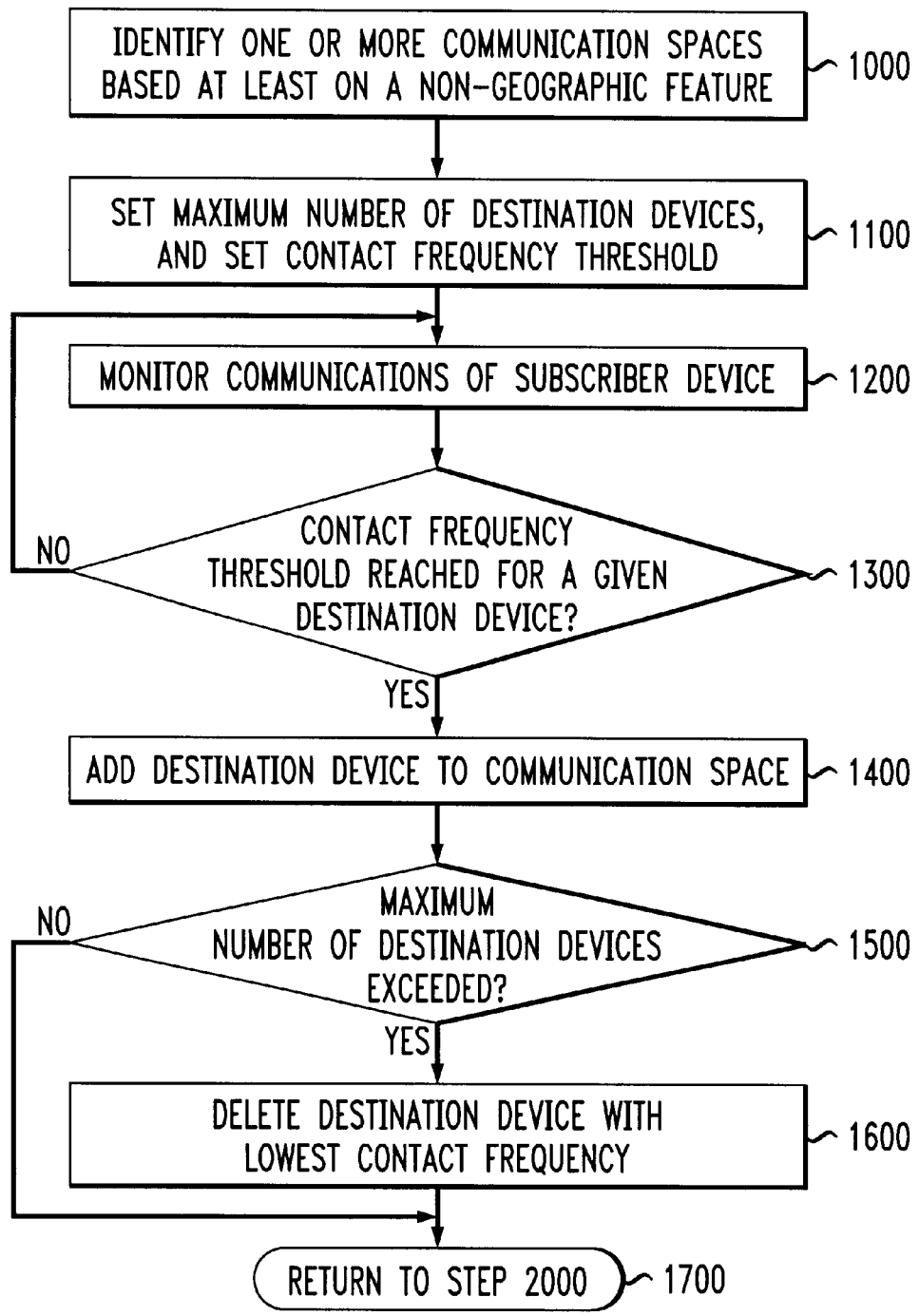
FIG. 5 is a flowchart outlining one exemplary method for identifying a communication space.

FIG. 5 is a flowchart outlining one exemplary method for identifying a local communication space (step 1000 of FIG. 4). In step 1100, the process sets a maximum number of communication destination devices that may be designated, and also sets a contact frequency threshold. The process then goes to step 1200 and monitors communications of a subscriber device. The process may monitor communications from the subscriber device or communications to the subscriber device, or both. The process then goes to step 1300.

In step 1300, the process determines whether the contact frequency threshold set in step 1100 has been reached for a given communication destination device. For example, if the contact frequency threshold has been set at five, then it is determined in step 1300 whether there have been five communications between the subscriber device and a given communication destination device. If the contact frequency threshold has been reached, the process goes to step 1400. Otherwise, the process returns to step 1200 and repeats steps 1200–1300.

In step 1400, the process adds the destination device to a communication space, which may then be defined as part of the subscriber's local communication space. Although not shown as a separate step, the subscriber may be given an opportunity to accept or reject the destination device as part of the local communication space. For example, if a subscriber has an automobile accident and has five telephone communications with an insurance agent regarding the accident, the subscriber may not wish to have the insurance agent's communication device added to the local communication space because the subscriber does not anticipate any further communications with the insurance agent. Thus, the subscriber may be given an opportunity to accept or reject proposed additions to the local communication space. For example, when the subscriber dials the number of the insurance agent's communication device the fifth time, the subscriber may be presented with a message that says, "Press the #key to add this number as a local number. Press * to not add this number."

Furthermore, the contact frequency threshold set by the process may be a running total threshold, or may be a threshold within a predetermined period of time, or a combination thereof. For example, the contact frequency threshold may be set to five within a one-week or one-month period, and/or may be set to twenty-five on a running total basis.

After a destination device is added to the communication space in step 1400, the process goes to step 1500. In step 1500, it is determined whether the maximum number of destination devices set in step 1100 has been exceeded. If the maximum number of destination device has been exceeded, the process goes to step 1600. Otherwise, the process goes to step 1700.

In step 1600, the process deletes a destination device from the subscriber's local communication space. Preferably, the deleted device is the device in the local communication space having the lowest contact frequency with the subscriber's device. Before the process deletes a device, the subscriber may be given an opportunity to accept or reject the deletion, similar to the opportunity to accept or reject an addition as described above. The process then goes to step 1700 and ends.

The order of steps 1100–1600 is not limited to the order shown. For example, when the maximum number of destination devices has been reached, the process may require that a device be deleted before, rather than after, another device is added.

It should be appreciated that the process of FIG. 5 is an optional automatic process that may be used to facilitate or supplement subscriber selection of communication devices for inclusion in a local communication space.

Figure 6:
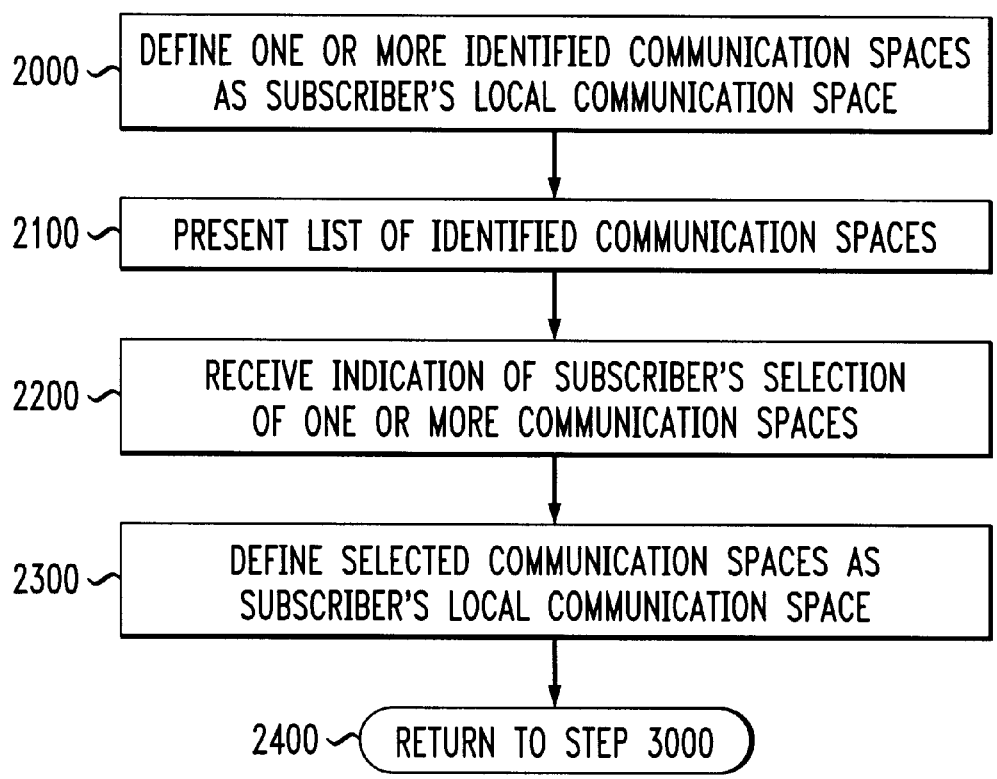
FIG. 6 is a flowchart outlining one exemplary method for defining a local communication space.

FIG. 6 is a flowchart outlining one exemplary method for defining a local communication space (comprising step 2000 of FIG. 4). In step 2100, a subscriber is presented with a list of identified communication spaces. This list may include predefined communication spaces and/or communications spaces automatically generated by the process. The process then goes to step 2100.

In step 2100, the process receives the subscriber's selection of one or more of the identified communication spaces. The process then goes to step 2300, where the selected one or more communication spaces are defined as the subscriber's local communication space. The process then goes to step 2400 and returns to step 3000.

It should be appreciated that, when the subscriber has designated one or more communication spaces in step 1000, there is no need to display these one or more communication spaces to the subscriber as in step 2100, because it can be automatically assumed that the designated one or more communication spaces are to be part of the defined local communication space.

The communication space defining device 200 can be implemented on a general purpose or special purpose computer, a programmed microprocessor or microcontroller and peripheral integrated circuit elements, an application specific integrated circuit (ASIC) or other integrated or non-integrated circuit, a programmable logic device such as a PLD, PLA, FPGA or PAL, or the like. In general, any device capable of implementing at least some portions of the flowcharts shown in FIGS. 4–6 can be used to implement the communication space defining device 200.

While the invention has been described in conjunction with the specific embodiments described above, many equivalent alternatives, modifications and variations will become apparent to those skilled in the art once provided with this disclosure. Accordingly, the exemplary embodiments of the invention as set forth above are considered to be illustrative and not limiting. Various changes to the described embodiments may be made without departing from the spirit and scope of the invention.

What is claimed is:

1. A method for providing communication services, comprising:
    associating one or more terminals with a subscriber based on non-geographical information received from the subscriber and developed by tracking communications between the subscriber and a plurality of terminals and identifying one or more frequently communicated-with terminals among the tracked communications, the associated one or more terminals being a communication space of the first terminal;
    billing the subscriber at a first rate for communications made to terminals included in the communication space; and
    billing the subscriber at a second rate for communications made to terminals not included in the communication space.

2. The method of claim 1, further comprising setting a limit on a number of terminals that may be associated with the subscriber.

3. The method of claim 1, further comprising billing the subscriber a one-time or periodic charge according to a total number of associated terminals.

4. The method of claim 1, further comprising defining the one or more frequently communicated-with terminals as part of the subscriber's local communication space, and deleting at least one less-frequently communicated-with terminal from the local communication space if an allowed number of terminals is exceeded for the local communication space.

5. The method of claim 1, the associating the one or more terminals further comprising:
    presenting the subscriber with a list of the one or more groups of terminals;
    receiving an indication from the subscriber indicating the subscriber's selection of one or more of the one or more groups of terminals; and
    defining the one or more selected groups of terminals as the communication space.

6. The method of claim 5, further comprising setting a limit on a number of groups that may be selected by the subscriber.

7. The method of claim 5, further comprising billing the subscriber a one-time or periodic charge according to the selected groups.

8. The method of claim 1, wherein the non-geographical information is at least one of a destination type, a frequency of communication, and a subscriber preference.

9. A communication services system, comprising:
    a communication space identification device that associates one or more terminals with a subscriber based on non-geographical information received from the subscriber, the associated one or more terminals being a communication space of the first terminal, the received subscriber information including tracking communications between the first terminal and a plurality of terminals and identifying one or more frequently communicated-with terminals among the tracked communications; and
    a billing system that bills the subscriber at a first rate for communications made to terminals included in the communication space, and bills the first terminal at a second rate for communications made to terminals not included in the communication space.

10. The system of claim 9, wherein the communication space identification device sets a limit on a number of terminals that may be associated with the subscriber.

11. The system of claim 9, wherein the billing system bills the subscriber a one-time or periodic charge according to a total number of associated terminals.

12. The system of claim 9, the communication space identification device further defining the one or more frequently communicated-with terminals as part of the subscriber's local communication space, and deleting at least one less-frequently communicated-with terminal from the local communication space if an allowed number of terminals is exceeded for the local communication space.

13. The system of claim 9, the associating the one or more terminals comprising the communication space identification device automatically grouping the one or more terminals based on information from one or more databases.

14. The system of claim 9, the associating the one or more terminals comprising the communication space identification device:
    presenting the subscriber with a list of the one or more groups of terminals;
    receiving an indication from the subscriber indicating the subscriber's selection of one or more of the one or more groups of terminals; and
    defining the one or more selected groups of terminals as the communication space.

15. The system of claim 14, further comprising the communication space identification device setting a limit on a number of groups that may be selected by the subscriber.

16. The system of claim 14, wherein the billing system bills the subscriber a one-time or periodic charge according to the selected groups.

17. The system of claim 9, wherein the non-geographical information is one or more of a destination type, a frequency of communication, and a subscriber preference.

* * * * *